United States Patent [19]

Davis et al.

[11] Patent Number: 5,194,564

[45] Date of Patent: Mar. 16, 1993

[54] PHOSPHINE OXIDE SUBSTITUTED POLYCARBONATE

[75] Inventors: Gary C. Davis, Albany, N.Y.; Christianus A. A. Claesen; Erwin M. A. Gijzen, both of Bergen op Zoom, Netherlands

[73] Assignee: General Electric Company, Schenectady, N.Y.

[21] Appl. No.: 900,355

[22] Filed: Jun. 18, 1992

[51] Int. Cl.$^5$ .............................................. C08G 64/08
[52] U.S. Cl. .................................. 528/167; 528/169; 528/196; 528/201; 528/204
[58] Field of Search ............... 528/167, 169, 196, 201, 528/204

[56] References Cited

U.S. PATENT DOCUMENTS

| | | | |
|---|---|---|---|
| 4,310,656 | 1/1982 | Brunelle | 528/200 |
| 4,330,664 | 5/1982 | Brunelle | 528/198 |
| 4,644,053 | 2/1987 | Brunelle et al. | 528/371 |
| 5,003,029 | 3/1991 | Ueda et al. | 528/167 |
| 5,015,720 | 5/1991 | Boden et al. | 528/179 |

OTHER PUBLICATIONS

Magdeev et al., Translated from Zhurnal Obshchei Khimii, vol. 42, No. 11, pp. 2415-2418, Nov. 1972.

*Primary Examiner*—Harold D. Anderson
*Attorney, Agent, or Firm*—William H. Pittman

[57] ABSTRACT

Novel flame retardant polycarbonates are prepared that maintain a $T_g$ and an impact strength similar to that of non-modified polycarbonates. More particular, phosphine oxide containing polycarbonates are prepared that demonstrate improved flame retardancy and the retention of impact strength and glass transition temperature.

8 Claims, No Drawings

PHOSPHINE OXIDE SUBSTITUTED POLYCARBONATE

BACKGROUND OF THE INVENTION

This invention relates to the preparation of flame retardant polycarbonates and more particularly to phosphine oxide containing polycarbonates.

Polycarbonates are well known as tough, clear, highly impact resistant thermoplastic resins. It is desirable to have polycarbonates possess flame retardancy. Several flame retardant agents are known to be effective. It is known to use alkali metal salts of strong sulfonic acids as flame retardant agents, however, the increased hydrolytic sensitivity of the polymer matrix presents some difficulties. When alkali metal salts of strong sulfonic acids are used, it is also necessary to use drip inhibitors and often gas phase flame retardant agents. Drip inhibitors such as Teflon ® are used, but the resulting polymers lose clarity. Gas phase inhibitors such as halogenated flame retardants have also been used. The use of halogens presents problems with corrosion and toxicity. As an alternative to halogenated compounds, phosphorus containing compounds such as triphenylphosphate have been used. Most effective phosphorus compounds are soluble in polycarbonates, and the resulting polymer blends have low glass transition temperatures ($T_g$) and low impact resistance compared to the base resin.

The present invention is based on the discovery that certain dihydroxyarylphosphine oxide units can be incorporated into polycarbonates to form polymers, and these polymers unexpectedly retain high $T_g$ values similar to polycarbonates not containing these dihydroxyarylphosphine oxide units. In addition to retaining high $T_g$ values, the phosphine oxide substituted polycarbonates exhibit improved flame retardancy as shown by high limiting oxygen index values.

SUMMARY OF THE INVENTION

Accordingly, the invention is a phosphine oxide substituted polycarbonate comprising the structural units of the formula

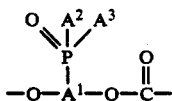
(I)

wherein $A^1$ is a trivalent substituted or unsubstituted aromatic radical; and $A^2$ and $A^3$ each are independently selected from aromatic radicals. Generally, 1-25 mole percent of the units of formula I are present in the phosphine oxide substituted polycarbonate, and preferably 5-10 mole percent of the total polymer.

Additionally, the polycarbonates of the present invention can further comprise structural units of the formula

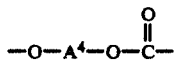
(II)

wherein $A^4$ is a divalent substituted or unsubstituted aromatic radical.

DETAILED DESCRIPTION OF THE INVENTION

Polycarbonates are generally formed by the reaction of a dihydroxyaromatic compound and a carbonate source.

One reactant for formation of the polycarbonates of this invention is a dihydroxyarylphosphine oxide of the formula

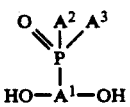
(III)

wherein $A^1$, $A^2$ and $A^3$ are as previously described. Specifically $A^1$ can be

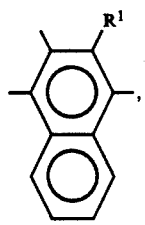

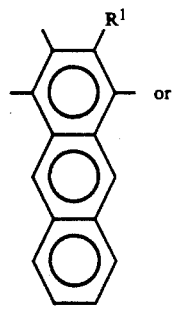
or

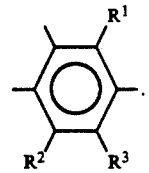

wherein $R^1$, $R^2$ and $R^3$ are hydrogen or alkyl radicals. $A^1$ is preferably $C_6H_3$. $A^2$ and $A^3$ may be any unsubstituted aromatic radical or substituted derivatives thereof. Suitable substituents include alkyl, alkenyl, halo, nitro, alkoxy and the like. Unsubstituted phenyl radicals are preferred. The hydroxy groups of formula III are preferably para to each other.

The dihydroxyarylphosphine oxide can generally be formed by the reaction of a quinone and a phosphine oxide or a suitable treated chlorophosphine. The formation of dihydroxyarylphosphine oxide compounds is disclosed in U.S. Pat. No. 5,003,029. Illustrative quinones include parabenzoquinone, 1,4-naphthoquinone, 1,4-anthraquinone, methyl-p-benzoquinone and dimethyl-p-benzoquinone. The preferred quinone is p-benzoquinone. Suitable phosphine oxides or chlorophosphine include diphenyl phosphine oxide or diphenyl chlorophosphine.

The preferred dihydroxyphenylphosphine oxide is 2,5-dihydroxyphenyldiphenylphosphine oxide and can be prepared as in Example 1.

EXAMPLE 1

A 2000 mL, three-neck round bottomed flask equipped with a mechanical stirrer, a $N_2$ bypass and an addition funnel was charged with 33.4 g (0.31 moles) of p-benzoquinone along with 900 mL of toluene and 100 mL of water. The addition funnel was charged with 68.0 g (0.31 moles) of chlorodiphenylphosphine dissolved in 80 mL of toluene. The reaction mixture was stirred into an emulsion and heated to 60°-65° C. The phosphine was added dropwise over a 1.5 hour period. The phosphine initially reacts with water to generate the phosphine oxide, which then reacts with the p-benzoquinone. The reaction mixture was stirred a further 2 hours as the precipitate solidified. The crude product (84.2 g) was filtered, washed with toluene and recrystallized with hot filtration from 3.8 L of acetone. The isolated white crystalline 2,5-dihydroxyphenyldiphenylphosphine oxide weighed 44.6 g (46.6% yield). The melting point was 213°-215° C. and $^1H$ and $^{13}C$ NMR showed the material to be the desired product.

The polycarbonates of the present invention can include both homo- and copolycarbonates. The copolycarbonates preferably contain about 1.0 mole percent to about 25 mole percent dihydroxyarylphosphine oxide units, and more preferably contain about 5 mole percent to about 10 mole percent units.

The non-phosphorus dihydroxyaromatic compounds useful for forming copolycarbonates may be any such compound known to the art. The material represented by formula IV

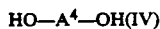

is the source of the structural units of formula II above. Illustrative non-limiting examples of non-phosphorus dihydroxyaromatic compounds include:
2,2-bis(4-hydroxyphenyl-propane (bisphenol A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether; and
4,4-dihydroxy-3,3-dihydroxydiphenyl ether.
Other useful non-phosphorus dihydroxyaromatic compounds which are also suitable for use in the preparation of the above polycarbonates are disclosed in U.S. Pat. Nos. 2,999,835; 3,028,365; 3,334,154; and 4,131,575, all of which are incorporated herein by reference. The preferred bisphenol is 2,2-bis(4-hydroxphenyl)propane (bisphenol A). The amount of non-phosphorus dihydroxyaromatic generally used is from about 75 mole percent to about 99 mole percent and preferably from 90 mole percent to about 95 mole percent.

The phosphine oxide containing polycarbonates can be formed by any method known to the art. Examples of methods to prepare phosphine oxide containing polycarbonates include an interfacial process, a transesterification process and a bishaloformate process.

The preferred method of forming the phosphine oxide substituted copolycarbonates is interfacially, that is, in a mixed aqueous-organic system which results in recovery of the polycarbonate in the organic phase. A carbonate precursor is used in the interfacial reaction and is preferably phosgene. When using an interfacial process it is also standard practice to use a catalyst system well known in the synthesis of polycarbonates and copolyestercarbonates. Suitable catalysts include the tertiary amines. Tertiary amines include aliphatic amines such as triethylamine, tri-n-propylamine, diethyl-n-propylamine, and tri-n-butylamine, and highly nucleophilic heterocyclic amines such as 4-dimethylaminopyridine. Such amines generally contain at least about 6 and preferably about 6-14 carbon atoms. The most useful amines are trialkylamines containing no branching on the carbon atoms in the 1- and 2-positions. Triethylamine is the most preferred.

A chain terminating agent to control the molecular weight of the polymers is usually present. Suitable chain termination agents are those commonly employed for polycarbonate formation, including monohydroxyaromatic compounds such as phenol, p-t-butylphenol and p-cumylphenol. Phenol is preferred. Quantities of chain terminating agents can range from about 0.5 to about 7 mole percent based on the total amount of non-phosphorus dihydroxyaromatic compound employed.

Another method of preparing polycarbonates is by transesterification with a bisphenol of a carbonate ester such as diphenyl carbonate or a bis-polyfluoroalkyl carbonate. U.S. Pat. Nos. 4,217,438, 4,310,656 and 4,330,664 describe the formation of polycarbonates by a transesterification method and are hereby incorporated by reference.

Still another method of polycarbonate formation is the reaction of bishaloformates with alkali metal hydroxides and various amines. One method for reacting bishaloformates with dihydroxy compounds is disclosed in U.S. Pat. No. 4,737,573 which is hereby incorporated by reference. Generally bischloroformate oligomer compositions are prepared by passing phosgene into a heterogeneous aqueous-organic mixture containing at least one dihydroxyaromativ compound. The reaction is a condensation reaction that typically takes place interfacially.

The following are examples of forming the phosphine oxide substituted copolycarbonate.

EXAMPLE 2

The phosphine oxide substituted copolycarbonate was prepared by interfacially phosgenating a mixture of 20.5 g of BPA, 3.1 g of 2,5-dihydroxyphenyldiphenylphosphine oxide (10 mole % compared to BPA), 0.64 g of p-cumylphenol chainstopper and 1.0 g of triethylamine in 160 mL methylene chloride and 125 mL of water. To the vigorously stirred emulsion was added 12.9 g of phosgene over a 25 minute period. Once the reaction was complete, the phases were separated and the polymer solution (methylene chloride layer) was extracted two times with 300 mL of 0.5N HCl followed by five times with 300 mL of water. The polymer solution was precipitated into 1 L of methanol in a blender. The white polymer powder (20.0 g) was isolated and dried at 120° C. Gel Permeation Chromatography (GPC) analysis of the polymer showed an $\overline{Mn}=18000$. $^1H$ and elemental analysis showed all the phosphine oxide was incorporated. The copolycarbonate shows a $^{31}P$ resonance at 24.5 ppm in deuterated chloroform. The copolymer gave a strong clear colorless solvent cast film. The Tg of the copolymer determined by DSC was 149° C.

The glass transition temperature of the substituted polycarbonate is an important property which affects the amount of unwanted polymer dripping that occurs during flame retardancy testing. Low $T_g$ polymers are more prone to this undesirable dripping, therefore it is desirable to maintain a higher $T_g$. A key aspect of the current invention is that the polycarbonate $T_g$ is maintained thus allowing the copolycarbonate to be flame retardant without sacrificing thermal properties.

EXAMPLE 3

Example 3 compares physical properties of phosphine oxide containing copolycarbonate with triphenylphosphine oxide polycarbonate blend and unsubstituted polycarbonate.

| Material | Additive | Limiting Oxygen Index[1] (LOI %) | $T_g$ (°C.) | Notched Izod[2] Average (j/m) |
| --- | --- | --- | --- | --- |
| Bisphenol A (BPA) polycarbonate | None | 27 | 150 | 800 |
| BPA polycarbonate | 3.7 mole % TPPO* | 31 | 130 | 700 |
| BPA polycarbonate | 7.4 mole % TPPO | 33 | 116 | 50 |
| 5.0 Mole % Phosphine oxide/BPA copolycarbonate | None | 33 | 152 | 650 |

*Triphenylphosphine oxide
[1]Performed according to ASTM D-2863.
[2]Performed according to ASTM D-256 using a modified testing procedure having a notch radius of 0.015 inches.

The phosphine oxide substituted polycarbonate was formed as in Example 2, and the TPPO was added as a blend in polycarbonate at the mole percent loading indicated in the above table. The TPPO/polycarbonate blend is known in the art. As can be seen in the above table, the LOI of phosphine oxide substituted polycabonate is improved over that of the corresponding polycarbonate not containing the dihydroxyarylphosphine oxide units and the notched Izod values are not sacrificed by incorporating the preferred structural units into the polycarbonate. The LOI test performed according to ASTM D-2863 measures the percentage of oxygen in nitrogen necessary to sustain the burning of the material tested. The greater the LOI %, the more oxygen needed, hence the higher the flame retardancy of the polymer being tested.

What is claimed is:

1. A polycarbonate polymer comprising the structural units of the formula

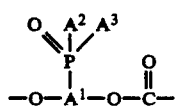

wherein $A^1$ is a trivalent substituted or unsubstituted aromatic radical; and $A^2$ and $A^3$ each are independently selected from aromatic radicals.

2. A polycarbonate as in claim 1 further comprising structural units of the formula

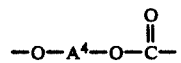

wherein $A^4$ is a divalent aromatic radical.

3. A polymer according to claim 1 wherein $A^1$ is

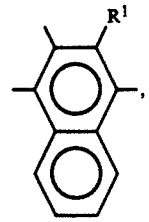

wherein $R^1$, $R^2$ and $R^3$ are hydrogen or an alkyl radical.

4. A polymer according to claim 1 wherein each of $A^2$ and $A^3$ is a phenyl radical.

5. A polymer according to claim 2 wherein $A^4$ is

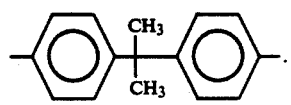

6. A polymer according to claim 2 wherein $A^1$ is $C_6H_3$ and $A^2$ and $A^3$ each are $C_6H_5$.

7. A polymer according to claim 1 wherein 1–25 mole percent of the structural units of the formula

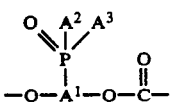
are present.
8. A polymer according to claim 1 wherein 5-10 mole percent of the structural units of the formula
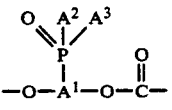
are present.
* * * * *